May 18, 1965

E. B. HECKENKAMP ETAL 3,183,977

TRACTOR POWER LIFT SYSTEM

Filed Dec. 3, 1962

Inventors
Edward B. Heckenkamp
Roy W. Johansen
John R. Plate

By [signature]

Attorney

Inventors
Edward B. Heckenkamp
Roy W. Johansen
John R. Plate
By W. Gerold
Attorney

United States Patent Office 3,183,977
Patented May 18, 1965

3,183,977
TRACTOR POWER LIFT SYSTEM
Edward B. Heckenkamp, Wauwatosa, Roy W. Johansen, West Allis, and John R. Plate, Milwaukee, Wis., assignors to Allis-Chalmers Manufacturing Company, Milwaukee, Wis.
Filed Dec. 3, 1962, Ser. No. 241,710
4 Claims. (Cl. 172—7)

The invention relates to power lift systems for tractors, and it is concerned more particularly with a combined power lift and automatic weight transfer system.

U.S. Patent 2,679,199, issued on May 25, 1954, to W. F. Strehlow for Power Lift Means Affording Depth Regulation of Tractor Propelled Implements, discloses a combined hydraulic power lift and automatic weight transfer system which is provided with a manually operable control valve for raising and lowering a tractor connected implement at the will of the operator, and with a draft sensing device for controlling the transfer of weight from the implement to the tractor while the implement is advanced in working condition.

Generally it is an object of the present invention to provide an improved power lift and weight transfer system for accomplishing the mentioned purposes, that is, to relieve an operator from the physical effort of lifting a tractor drawn implement when lifting becomes necessary, as for instance in the case of a plow at the end of a furrow; to lower the implement from a raised position when desired; and to automatically transfer weight from the implement to the tractor drive wheels for increased traction when needed, and to remove the additional weight from the tractor wheels when it is no longer needed for increased traction.

The provision of a practical and satisfactory power lift and weight transfer system presents special problems if the system is to be used in connection with a large and powerful tractor and with correspondingly large and heavy implements. In that case a relatively large amount of power must be provided so that a heavy implement can be lifted from a lowered to a raised position at the will of the operator and at a reasonably fast rate of speed. On the other hand, the power demand for effecting weight transfer will be much smaller than the relatively large power which is needed for raising the implement to an elevated position, such as the raised position to which a plow must be adjusted for transport purposes. Further, for satisfactory and smooth operation, the power to effect weight transfer must be controlled with a much higher degree of precision than the power to effect raising and lowering of the implement at the will of the operator. Application of lifting power to the implement for weight transfer purposes should be instantaneous, but relief of the lifting power for return to normal should be gradual.

Another important consideration for the provision of a satisfactory hydraulic power lift and weight transfer system is the matter of power economy. Since all the power for the hydraulic system is ultimately furnished by the tractor motor, it is obvious that whatever power is expended for weight transfer purposes is lost for draft purposes. It is therefore desirable that no more than the minimum amount of power be expended for weight transfer purposes.

With regard to the power provided for implement lift purposes it is desirable that such power be made available not only for lifting the implement which is used for weight transfer purposes but also for operating other equipment which may be installed on or connected with the tractor. In that case the tractor will be equipped not only with a hydraulic circuit for implement lift and weight transfer purposes but also with one or more additional hydraulic circuits for performing other functions independently of the circuit which performs the implement lift and weight transfer functions.

Generally, it is an object of the invention to provide an improved hydraulic power lift and weight transfer system which will take care of the hereinbefore mentioned requirements in a practical and fully satisfactory manner.

More specifically, it is an object of the invention to provide an improved pump and valve arrangement which lends itself for use in a hydraulic system incorporating one circuit for implement lift and weight transfer purposes and another circuit, or several other circuits, for performing other functions either simultaneously with or separately from and independently of said one circuit.

Another object of the invention is to provide an improved pump and valve arrangement of the above outlined character which will provide for instantaneous application of fluid pressure to an implement lifting ram and for gradual release of said fluid pressure, as needed for weight transfer purposes.

Another object of the invention is to provide an improved pump and valve arrangement of the hereinbefore outlined character, which is extremely simple in construction, efficient and reliable in operation, and which lends itself to manufacture at relatively low costs.

The foregoing and other objects and advantages are attained by the present invention, various novel features of which will be apparent from the description herein of an embodiment of the invention, and will be set forth in the appended claims.

Referring to the accompanying drawings.

Figure 1:
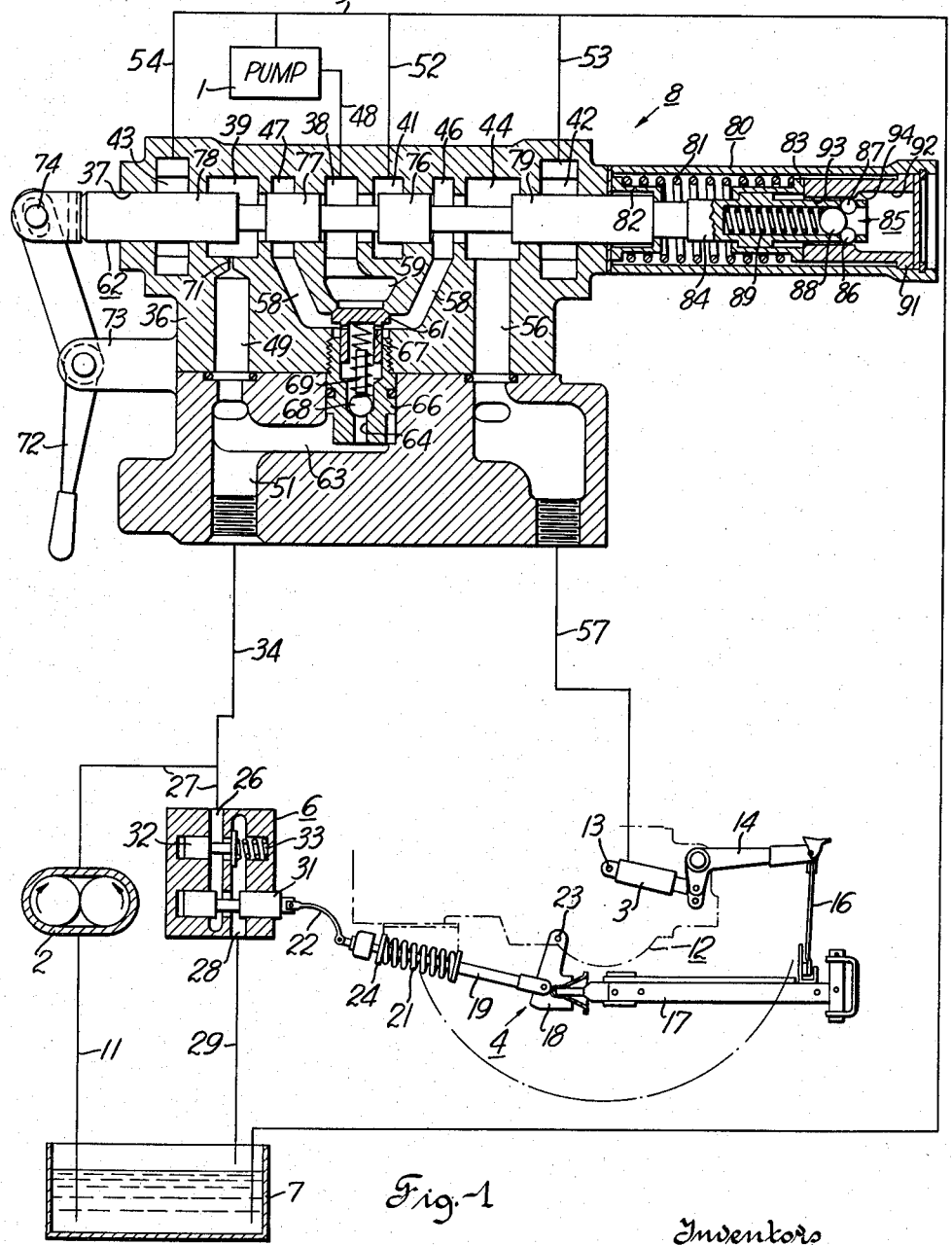
FIG. 1 is a diagrammatic view of a hydraulic power lift and weight transfer system incorporating the invention, a manually adjustable control valve of the system being shown in an implement hold position.

The implement lift and weight transfer system which is diagrammatically outlined in FIG. 1 comprises, in general; a first fluid pump 1, a second fluid pump 2, a single acting lifting ram 3, a draft sensing device 4, a bypass valve 6 for the pump 2, a sump 7, and a spool type hydraulic control valve 8.

The pumps 1 and 2 have large and small output capacities, respectively, the pump 1, being preferably a multiple plunger pump of conventional construction, and the pump 2, while shown as a gear pump, may also be a plunger pump, preferably a single plunger pump, of conventional construction. Both pumps are connected in fluid receiving relation with the sump 7, the pump 1 being connected at its suction side with a sump line 9, and the pump 2 being connected at its suction side with a sump line 11. Driving power for the pumps is derived from a tractor motor, not shown, in conventional manner; that is, the pumps will be running as long as the tractor motor is running.

A rear part of the tractor on which the pump 1 and 2 and other components of the system are installed is shown in dash-dotted lines in FIG. 1 and generally designated by the reference character 12. The barrel end of the ram 3 is pivoted at 13 on the tractor body, and the plunger end of the ram is operatively connected with an implement lift arm 14 in conventional manner. The lift arm 14 has a depending link connection 16 with the draft bar 17 of an implement, such as a plow, not shown. The draft bar 17 is hitched to the tractor body in conventional manner through the draft sensing device 4 which comprises a coupling arm 18, pull rod 19, load sensing spring 21, and link connection 22 with bypass valve 6. Arm 18 is pivoted at 23 on the tractor body and has a hook connection with an eye at the forward end of the draft bar 17, which may be constructed as shown more fully in U.S. Patent 2,834,277, issued on May 13, 1958, to W. H. Tanke for Quick Hitch System. The load sensing spring 21 bears at its rear end upon an abutment on the tractor body, and at its forward end against a collar 24 on the rod 19 which extends through the spring and is pivotally connected at its rear end with the coupling arm 18. In operation, when draft is transmitted from the tractor to an implement through the draft bar 17, the spring 21 yields more or less, depending on the magnitude of the draft; and the resulting reciprocating movement of the pull rod 19 is communicated to the bypass valve 6 through the actuating linkage 22.

The bypass valve 6 for the low capacity pump 2 has an input passage 26 which communicates with the fluid delivery side of the pump 2 through a connecting line 27. An output passage 28 of the valve 6 communicates with the sump 7 through an exhaust line 29, and a movable valve element 31 is operable to control fluid flow from the input passage 26 to the output pasage 28. Also incorporated in the valve 6 is a relief valve plunger 32 which is biased by a spring 33 to closed position.

FIG. 1 shows the bypass valve 6 in an open condition which permits passage of fluid from the pump 2 through the valve 6 back to sump without appreciable resistance. In operation of the tractor, the bypass valve remains open as long as the draft transmitted through the draft bar 17 does not exceed a predetermined limit. However, when the draft exceeds that limit, the bypass valve is closed by operation of the draft sensing device 4, and as a result the fluid discharge from the pump 2 will be forced into valve 8 through a connecting line 34 and, depending on the condition of the valve 8 as more fully explained hereinbelow, will become effective to transfer implement weight to the tractor drive wheels. When the draft force returns to or falls below the predetermined value, the draft sensing device automatically causes the valve 6 to open, thereby restoring the pump 2 to idling condition and permitting pressure fluid from the ram 3 to return to sump 7 through lines 34 and 29. The stiffness of the relief valve spring 33 determines the maximum amount of implement weight which may be transferred to the tractor by operation of the pump 2. Springs 33 of different yielding characteristics may be selectively installed in the valve 6 in order to vary the maximum amount of weight transfer, depending on the size and weight of the tractor and of the associated implement.

The hydraulic control valve 8 which is diagrammatically shown in the upper part of FIG. 1 is an open center, four position, six connection, directional spool valve. It comprises a casing 36 which has a valve bore 37 and axially spaced radial enlargements thereof presenting, respectively, a first inlet chamber 38; a second inlet chamber 39; first and second exhaust chambers 41 and 42; a drain chamber 43 for seepage fluid; a delivery chamber 44; and first and second transfer chambers 46 and 47. The first inlet chamber 38 communicates with the fluid delivery side of the first fluid pump 1 through a connecting line 48; the second inlet chamber 39 communicates with the fluid delivery side of the pump 2, and with the input passage 26 of the bypass valve 6 through one branch 49 of an internal passage 51 of the valve housing 36 and through the connecting lines 34 and 27; the first and second exhaust chambers 41 and 42 and the drain chamber 43 communicate with the sump 7 through exhaust lines 52, 53 and drain line 54, respectively, and the sump line 9; the delivery chamber 44 communicates with the ram 3 through an internal passage 56 of the valve casing 36 and through a connecting line 57; and the first and second transfer chambers 46 and 47 are connected with each other through a U-shaped internal passage 58. The transfer chambers 46 and 47 further communicate with the first inlet chamber 38 through an internal passage 59 which extends upwardly from the center portion of the U-shaped passage 58 and terminates in the first inlet chamber 38. The junction of the U-shaped passage 58 with the passage 59 is controlled by a plunger type check valve 61 which is spring biased into the position shown in FIG. 1 so as to prevent return flow of fluid from the transfer chambers 46 and 47 into the first inlet chamber 38, and which yields to pressure created in the first inlet chamber 38 by the pump 1.

A second branch 63 of the internal valve passage 51 communicates with the U-shaped passage 58 through bore 64 of a check valve plug 66 within the valve casing 36 and through radial bores 67 in the hollow plunger of the check valve body 61. The check valve plug 66 contains a ball type check valve 68, and a coil spring 69 reacts between the ball of valve 68 and the plunger of valve 61. The ball of valve 68 is seated on an internal shoulder of the plug 66 so as to prevent return flow of fluid from the U-shaped passage 58 through the radial bores 67 into the bore 64 and branch 63 of the internal passage 51 of the valve casing 36. Fluid delivered from the second pump 2 will flow into the valve passage 51 through the connecting line 34 when the bypass valve 6 is closed, and the ball 68 will be lifted from its seat by the pressure fluid passing to the ram 3 for weight transfer purposes, as will be explained more fully hereinbelow.

The branch 49 of the valve passage 51 has a restriction 71 at its junction with the second inlet chamber 39 so as to provide a high resistance passage from the delivery side of the pump 2 into the second inlet chamber 39. On the other hand, the branch 63 of the passage 51 and the bores 64 and 67 provide a low resistance passage from the delivery side of the pump 2 into the U-shaped passage 58 of the valve body 36. This low resistance passage is controlled by the ball type check valve 68, so as to prevent return flow of fluid from the ram 3 to the sump 7 through the line 34 when the bypass valve 6 is open and the valve 8 is in the hold position as shown in FIG. 1.

Reciprocably mounted in the bore 37 of the valve casing 36 is a valve spool 62 which is selectively adjustable to any of the four positions in which it is shown in FIGS. 1, 2, 3 and 4, respectively. A manually operable lever 72 for effecting such adjustment of the valve spool is diagrammatically indicated in the drawings. As shown, the lever 72 is pivotally mounted on a stationary bracket 73 connected with the valve casing 36, and rocking of the lever 72 is transmitted to the valve spool 62 by a pin and slot connection 74.

Figure 2:
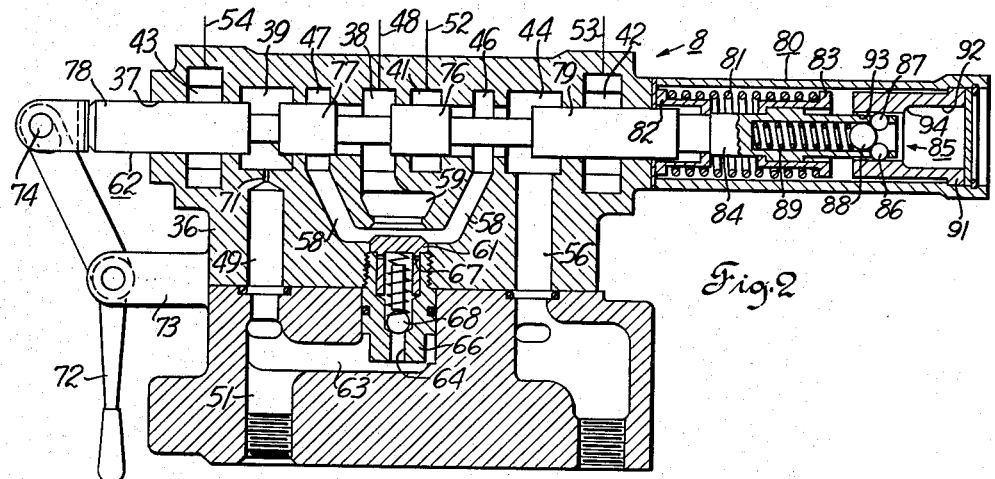
FIG. 2 is a detail view showing the manually adjustable control valve of FIG. 1 in an implement lift position.
Figure 3:
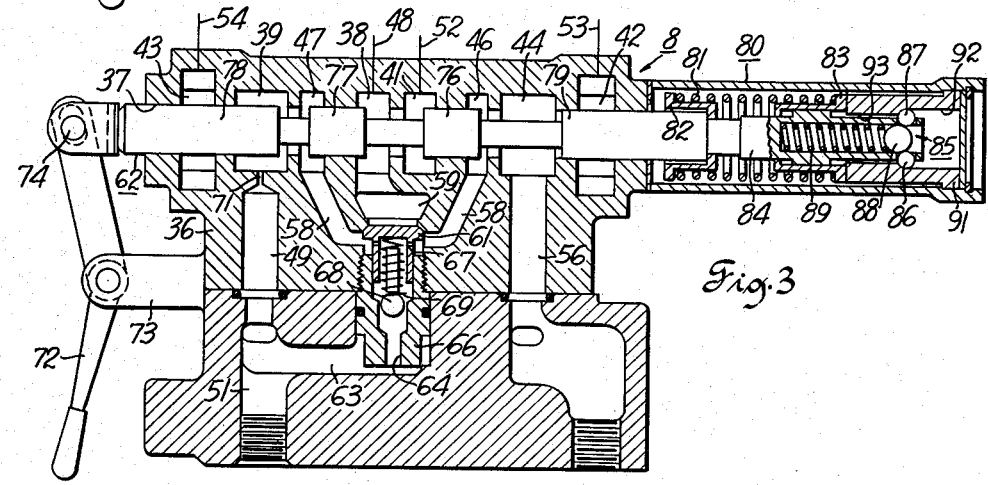
FIG. 3 is another detail view showing the manually adjustable control valve of FIG. 1 in a weight transfer position.
Figure 4:
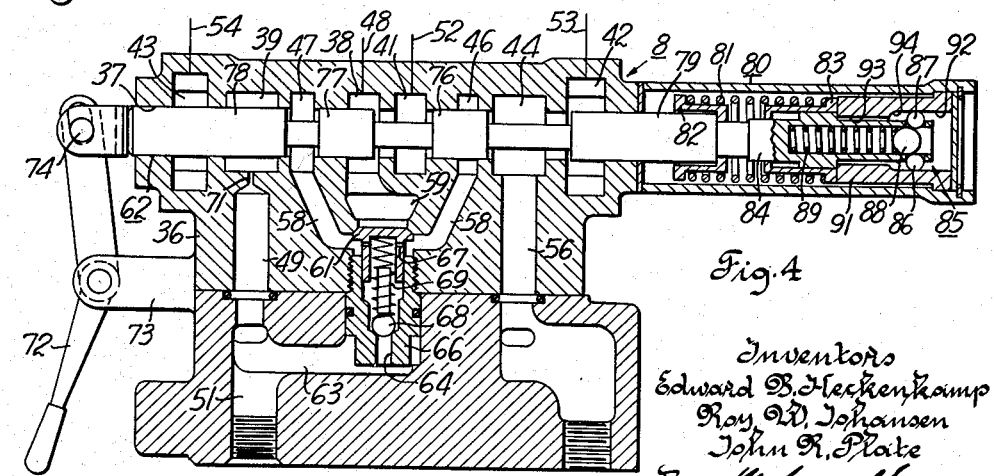
FIG. 4 is another detail view showing the manually adjustable control valve of FIG. 1 in an implement lowering position.

The spool 62 of the valve 8 has a first land 76 which is operative to control fluid passage between the first inlet chamber 38 and the first exhaust chamber 41 as illustrated by FIGS. 1 and 2, and which is also operative to control fluid passage between the first transfer chamber 46 and the outlet chamber 44 as illustrated by FIGS. 3 and 4.

A second land 77 of the valve spool 62 is operative to control fluid passage between the second inlet chamber 39 and the second transfer chamber 47 as illustrated by FIGS. 2 and 3.

A third land 78 of the valve spool 62 is operative to control fluid passage between the second inlet chamber 39 and the second transfer chamber 47 as illustrated by FIGS. 3 and 4.

A fourth land 79 of the valve spool 62 is operative to control fluid passage between the outlet chamber 44 and the second exhaust chamber 42, as illustrated by FIGS. 3 and 4.

In the hold position of the valve 8 as shown in FIG. 1, the land 76 establishes communication between inlet chamber 38 and exhaust chamber 41, and between first transfer chamber 46 and delivery chamber 44. The land 77 disconnects second inlet chamber 39 from second transfer chamber 47. The land 78 is ineffective, and the land 79 disconnects the delivery chamber 44 from the second exhaust chamber 42. Pressure fluid is trapped in the ram 3 by lands 77, 76, 79, and by check valves 61 and 68. The large capacity pump 1 idles, and the small capacity pump 2 could feed into the ram 3 through the ball check valve 68 if bypass valve 6 were closed. However, the valve 8 is normally placed into the hold position only after the implement has been raised, and in the absence of draft on the implement, bypass valve 6 is open and pump 2 idles the same as pump 1.

In the lift position of valve 8 as shown in FIG. 2, the land 76 disconnects inlet chamber 38 from first exhaust chamber 41, and connects first transfer chamber 46 with delivery chamber 44. The land 77 disconnects second inlet chamber 39 from second transfer chamber 47; the land 78 is ineffective, and the land 79 disconnects delivery chamber 44 from second exhaust chamber 42. Pressure fluid from pump 1 passes through check valve 61, passage 58, first transfer chamber 46, delivery chamber 44, passage 56 and line 57 into the expansion chamber of ram 3. The small capacity pump 2 could feed into the ram 3 through the ball check valve 68 but will do so only if draft of sufficient magnitude is transmitted through the sensing device 4 to close bypass valve 6. In that case both pumps 1 and 2 would feed pressure fluid jointly into the ram 3.

In the weight transfer position of valve 8 as shown in FIG. 3, the land 76 establishes communication between inlet chamber 38 and first exhaust chamber 41, and between first transfer chamber 46 and delivery chamber 44. The land 77 establishes communication between the second inlet chamber 39 and second transfer chamber 47. The land 78 is ineffective, and the land 79 disconnects delivery chamber 44 from second exhaust chamber 42. The large capacity pump 1 idles, consuming negligible power; and the small pump 2 likewise idles as long as the bypass valve 6 is open.

If an implement, such as a plow, is advanced in working position by the tractor and the valve 8 is in the weight transfer position, the sensing device 4 will alternately close and open the bypass valve 6, depending on draft conditions. When the draft exceeds a predetermined limit the valve 6 closes and the small pump will feed pressure fluid into the ram 3 through lines 27, 34, branch 63 of passage 51, bore 64 of plug 66, radial bores 67, passage 58, chambers 46, 44, passage 56 and line 57. As a result of such pressure fluid delivery from the small capacity pump 2 into the lifting ram 3, while the implement is advanced in working position, some of the weight of the implement and from the tractor front wheels will be transferred to the tractor rear driving wheels. The additional weight thus imposed upon the tractor drive wheels will improve the ability of the tractor to pull a heavy load without wheel slippage.

The yielding characteristic of the loading spring 33 for the relief valve plunger 32 of the valve 6 determines the maximum amount of weight which can be transferred from the implement to the tractor by operation of the pump 2 and ram 3. The stiffer the spring the higher will be the fluid pressure needed to unseat the check valve plunger 32; and, consequently, the higher will be the maximum lifting force exerted by the ram 3 and lift arm 14 upon the implement draft bar 17.

Closing and opening of the bypass valve 6 is effected by relatively short back and forth movements of the valve element 31. Upon closing of the valve 6 while the valve 8 is in the weight transfer position shown in FIG. 3, practically all of the oil delivered from the pump 2 will flow through the low resistance passage afforded by the branch 63, bore 64 and radial bores 67 of the check valve plunger 61. Some oil delivered by the pump 2 will also flow into the U-shaped passage 58 through the high resistance passage afforded by branch 49, restriction 71 and chambers 39, 47. This oil flow, however, will be small as compared with the oil flow through the low resistance passage. Accordingly, application of lifting power to the implement draft bar 17 will be instantaneous when the draft sensing device calls for weight transfer from the implement to the tractor. The large capacity pump 1 does not participate in such weight transfer. It continues to idle during weight transfer, unless it is called upon to perform other functions as will be explained hereinbelow with reference to FIG. 5.

When a heavy draft condition which has caused weight transfer from the implement to the tractor subsides, it is desirable for reasons of economical tractor operation, that the tractor wheels be relieved of the additional weight which has been transferred to them by operation of the small capacity pump 2 and lift ram 3. More particularly, in the interest of satisfactory implement performance, the restoration of weight from the tractor to the implement should be gradual and not sudden as the weight transfer from the implement to the tractor. This desirable result is accomplished by the provision of the restriction 71 at the junction of the branch 49 with the second inlet chamber 39. When the bypass valve 6 opens due to draft decrease while the valve 8 is in the weight transfer position, pressure fluid from the ram 3 may return to sump through line 57, passage 56, chambers 44, 46, passage 58, chambers 47, 39, restriction 71, branch 49 of passage 51, line 34, open valve 6, and exhaust line 29. Return flow through the low resistance passage 64, 63 is prevented by ball check valve 68. The size of the restriction 71 is such that any lifting force of arm 14 effective while the bypass valve 6 is closed will vanish gradually when the bypass valve 6 is opened by operation of the draft sensing device 4.

When the valve 8 is in the weight transfer position as shown in FIG. 3, the small capacity pump 2 is operable to deliver pressure fluid to the lifting ram 3 independently of the large capacity pump 1.

In the lowering position of the valve 8 as shown in FIG. 4, the land 76 establishes communication between the first inlet chamber 38 and first outlet chamber 41, and it interrupts communication between the first transfer chamber 46 and the delivery chamber 44. The land 77 is ineffective. The land 78 disconnects the second inlet chamber 39 from the second transfer chamber 47, and the land 79 establishes communication between the delivery chamber 44 and the second exhaust passage 42. Pressure fluid may return rapidly from the ram 3 to sump through line 57, passage 56, chambers 44, 42, exhaust line 53 and sump line 9. The large capacity pump 1 feeds back to sump through chambers 38, 41, exhaust line 52 and sump line 9, unless called upon to perform other functions as will be explained with reference to FIG. 5. The small capacity pump 2 will feed back to sump through lines 27, open valve 6 and exhaust line 29, assuming that the tractor is standing still and no draft is transmitted through the draft sensing device 4. Should for any reason the valve 6 be closed while the valve 8 is in the lowering position, the fluid discharge of the pump 2 will return to sump through relief valve 32, 33 of valve 6.

A centering mechanism 80 for the spool 62 of the valve 8 comprises a coil spring 81 and thrust cups 82 and 83 which cooperate with a stem portion 84 of the valve spool 62 to yieldingly retain the spool in the centered position in which it is shown in FIG. 1. Shifting movement of the valve spool in either direction from its center position is yieldingly opposed by the spring 81 in conventional manner.

A detent mechanism 85 for the valve spool 62 comprises two detent balls 86, 87 which are caged in the tubular end of the valve stem 84 and are biased radially outward by a backing ball 88 and a coil spring 89. A stationary guide sleeve 91 for the balls 86 and 87 is mounted on the valve casing 36 and presents an internal cylindrical wall 92 at the outer end of the sleeve 91, and another internal cylindrical wall 93 extending axially from the inner end of the wall 92. The wall 93 has a smaller diameter than the wall 92, and at the junction of the walls 92, 93 the sleeve 91 presents a concave shoulder 94. As shown in FIG. 3, the internal shoulder 94 of the sleeve 91 is engageable by the balls 86, 87 to releasably retain the valve spool 62 against axial displacement by the centering spring 81 after the spool has been moved from the hold position shown in FIG. 1 to the weight transfer position shown in FIG. 3 by manipulation of the hand lever 72. The spool 62 can therefore be adjusted to occupy either the hold position shown in FIG. 1 or the weight transfer position shown in FIG. 3 and remain in either of said positions without being held there manually by means of the lever 72. The spool will automatically return from the lift position of FIG. 2 to the hold position shown in FIG. 1 when the operator releases his hold on the hand lever 72. Similarly, the spool 62 will automatically return from the lowering position shown in FIG. 4 to the weight transfer position shown in FIG. 3 when the hand lever 72 is released. Return of the valve spool 62 from the weight transfer position shown in FIG. 3 to the hold position shown in FIG. 1 may be effected by application of manual power to the hand lever 72 so as to overcome the restraint which is exerted against such movement by the coaction of the balls 86, 87 with the shoulder 94 under the pressure of the spring 89.

Figure 5:
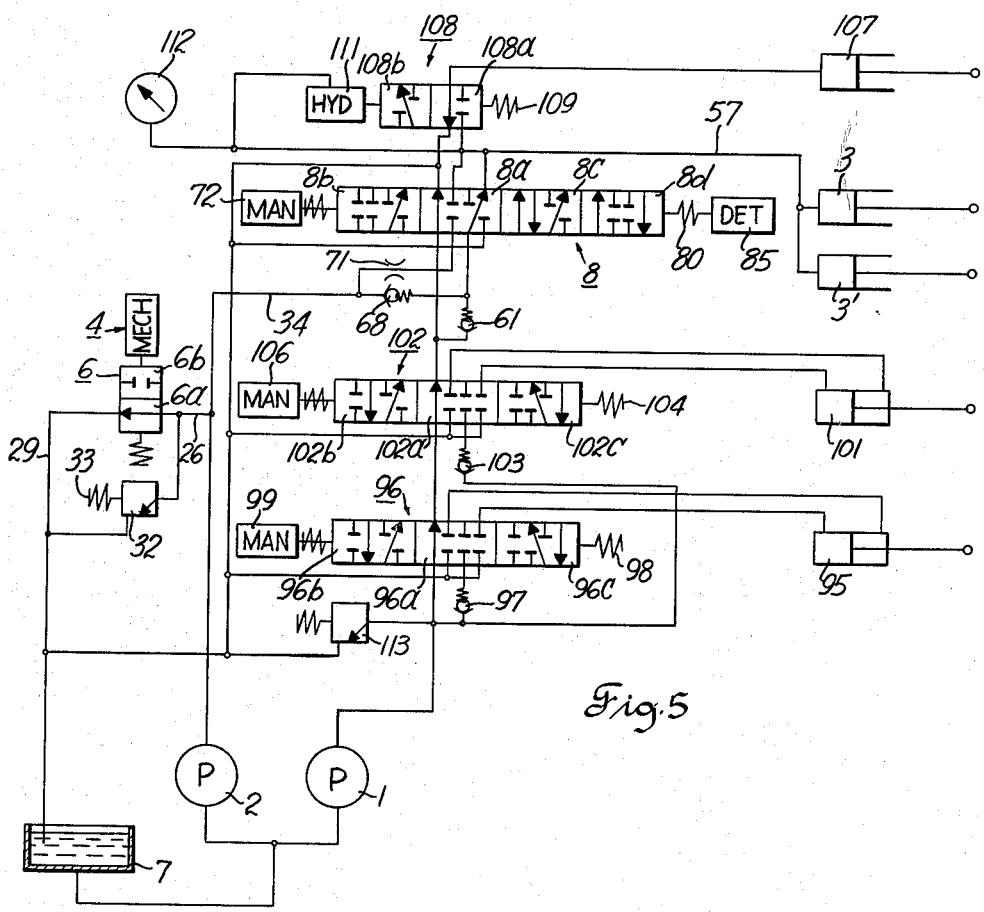
FIG. 5 is a schematic circuit diagram of a hydraulic system incorporating a circuit for implement lift and weight transfer, another circuit for operating an auxiliary, single acting, remote ram, and two circuits for operating auxiliary double acting rams.

In the diagram of FIG. 5, standard symbols of the Joint Industry Conference are used to show the spool valve 8 including check valves 61, 68, and restriction 71, and associated manual control mechanism 72, centering mechanism 80 and detent mechanism 85. Instead of one ram 3 as in FIG. 1, FIG. 5 shows two rams 3 and 3' in parallel, as the use of two parallel rams is more common in practice than only one ram. The pumps 1 and 2, the sump 7, the bypass valve 6 together with the draft sensing device 4, and the spring loaded relief valve 32, 33 are also shown symbolically in FIG. 5.

In addition to the components explained hereinbefore with reference to FIGS. 1 to 4, the diagram of FIG. 5 symbolically shows a first auxiliary double acting ram 95 and associated three position, five connection directional valve 96, together with check valve 97, centering mechanism 98 and manual actuating mechanism 99.

The system illustrated by FIG. 5 further includes a second auxiliary double acting ram 101 and associated three position, five connection directional control valve 102 together with check valve 103, centering mechanism 104 and manual actuating mechanism 106.

In addition to the auxiliary double acting rams 95, 101 and associated valves 96, 102, FIG. 5 shows an auxiliary single acting ram 107 and associated two position, three connection directional valve 108. The valve 108 is normally biased by a spring 109 into its first position in which it is shown in FIG. 5, and a hydraulic pilot control mechanism 111 is operable to shift the valve 108 into its second position when the fluid pressure acting upon the rams 3, 3' reaches a predetermined limit. A pressure gauge 112 indicates the pressure in rams 3, 3'.

An auxiliary single acting ram such as the ram 107 may serve as a remote ram for applying auxiliary lifting power to a trail type implement. For a fuller disclosure of a ram of this type, reference may be had to U.S. Patent 2,777,375, issued on January 15, 1957, to R. Carlin and E. B. Heckenkamp for Traction Boosting Power Lift System.

In operation of the system shown in FIG. 5, both pumps 1 and 2 are normally running, the same as explained in connection with FIG. 1. Valve 8 as shown in FIG. 5 is in the hold position which has been explained hereinbefore in connection with FIG. 1 and which is illustrated by the block 8a in FIG. 5. The block 8b in FIG. 5 at the left of the hold position block 8a illustrates the lift position shown in FIG. 2; the block 8c at the right of the hold position block 8a illustrates the weight transfer position shown in FIG. 3; and the block 8d at the right of the weight transfer block 8c illustrates the lowering position shown in FIG. 4.

The valve 96 shown in FIG. 5 is adjustable to a hold position illustrated by the block 96a; to a lift position illustrated by the block 96b; and to a lowering position illustrated by the block 96c.

Similarly, the valve 102 shown in FIG. 5 is adjustable to a hold position illustrated by the block 102a; to a lift position illustrated by the block 102b; and to a lowering position illustrated by the block 102c.

The valve 108 shown in FIG. 5 is adjustable to a float condition illustrated by block 108a, and to a lift position illustrated by block 108b.

The bypass valve 6 shown in FIG. 5 is adjustable to an open position illustrated by block 6a, and to a closed position illustrated by block 6b.

A conventional relief valve 113 is connected between pump 1 and sump 7.

The system shown in FIG. 5 includes a plurality of fluid motors, considering the parallel connected rams 3, 3' as one such fluid motor and the rams 95, 101 and 107 as additional fluid motors. The valves 6, 8, 96, 102 and 108, check valves 61, 68, 97 and 103, and the fluid lines connecting the pumps, valves, fluid motors and sump generally represent fluid distributing means for conveying the fluid output of the first pump 1 to any one of the mentioned fluid motors independently of the fluid output of the second pump 2, and for conveying the fluid output of the second pump 2 to one of the fluid motors, namely the parallel connected rams 3, 3', independently of the fluid output of the first pump 1.

To illustrate, let it be assumed that the valve 8 is in the weight transfer position 8c, the bypass valve 6 is in the closed position 6b, and the valve 96 is in the lift position 96b. In that case the first pump 1 will deliver pressure fluid through the check valve 97 into the left hand end of the ram 95 independently of the second pump 2; and the second pump will deliver pressure fluid through the check valve 68 into the fluid motor 3, 3' independently of the first pump 1.

Likewise the fluid discharge of the first pump 1 may be directed to either side of the ram 101 by manipulation of the valve 102 while the valve 8 is in its weight transfer position or any other position, and such fluid delivery of the first pump will be independent of the fluid delivery of the second pump 2.

Generally, the system shown in FIG. 5 includes, in addition to the implement lifting ram 3 and associated valves 6 and 8, an auxiliary fluid motor, such as the double acting ram 95, and auxiliary manually adjustable valve means 96 for supplying the auxiliary fluid motor 95 with pressure fluid from the first pump P1, independently of the second pump P2, while the control valve 8 for the implement lifting ram 3 is adjusted to any of its hold, lift, weight transfer or lower positions.

It should be understood that it is not intended to limit the invention to the specific systems herein shown and described for purposes of illustration, as various modifications within the scope of the appended claims may occur to persons skilled in the art.

Having now particularly described and ascertained the nature of our said invention and the manner in which it is to be performed, we declare that what we claim is:

1. In a hydraulic power lift system for tractors, the combination of a first and second fluid pump having large and small output capacities, respectively; an implement lifting ram; a draft sensing device; sump means operatively connected to said pumps; a bypass valve interposed between said sump and said second pump; means operatively connecting said bypass valve with said draft sensing device so said bypass valve is closed and opened in response to increase and decrease, respectively, of draft sensed by said draft sensing device; a manually operable control valve connected in fluid communicating relation with said first pump, second pump and ram; said control valve being selectively adjustable independently of said bypass valve for activating said ram for holding, lifting, lowering and transferring weight and, upon adjustment to said weight transferring being effective in response to closing and opening, respectively, of said bypass valve, to activate and deactivate said ram independently of pressure fluid delivery thereto from said first pump; said control valve including low and high resistance fluid passages simultaneously operative upon adjustment of said control valve to said weight transferring, to connect said ram in fluid communicating relation with said second fluid pump; and check valve means associated with said low resistance passage so as to prevent return flow of fluid from said ram through said low resistance passage.

2. In a hydraulic power lift system for tractors, the combination of a first and second fluid pump having large and small output capacities, respectively; an implement lifting ram; a draft sensing device; sump means operatively connected to said pumps; a bypass valve interposed between said sump and said second pump; means operatively connecting said bypass valve with said draft sensing device so said bypass valve is closed and opened in response to increase and decrease, respectively, of draft sensed by said draft sensing device; a manually operable control valve connected in fluid communicating relation with said first pump, second pump and ram; said control valve being selectively adjustable independently of said bypass valve for activating said ram for holding, lifting, lowering and transferring weight and, upon adjustment to said weight transferring, being effective in response to closing and opening, respectively, of said bypass valve, to activate and deactivate said ram independently of pressure fluid delivery thereto from said first pump; said manually operable control valve comprising a casing having a valve bore and axially spaced radial enlargements thereof presenting, respectively, a first inlet chamber in communication with the fluid delivery side of said first pump, a second inlet chamber, first and second exhaust chambers in communication with said sump, a delivery chamber in communication with said ram, first and second transfer chambers connected with each other and with said first and second inlet chambers by internal passage means of said casing, an inlet passage connecting said internal passage means with the fluid delivery side of said second pump; check valve means associated with said internal passage means for preventing return flow of fluid from said transfer chambers into said first inlet chamber; and a spool valve reciprocally mounted in said valve bore for controlling fluid flow from said first and second inlet chambers to said first and second transfer chambers, respectively, and from said first transfer chamber to said delivery chamber and from the latter to said second exhaust chamber.

3. In a hydraulic power lift system for tractors, the combination of a first and second fluid pump having large and small output capacities, respectively; an implement lifting ram; a draft sensing device; sump means operatively connected to said pumps; a bypass valve interposed between said sump and said second pump; means operatively connecting said bypass valve with said draft sensing device so said bypass valve is closed and opened in response to increase and decrease, respectively, of draft sensed by said draft sensing device; a manually operable control valve connected in fluid communicating relation with said first pump, second pump and ram, said control valve being selectively adjustable independently of said bypass valve for activating said ram for holding, lifting, lowering and transferring weight and, upon adjustment to said weight transferring being effective in response to closing and opening, respectively, of said bypass valve, to activate and deactivate said ram independently of pressure fluid delivery thereto from said first pump; said manually operable control valve comprising a casing having a valve bore and axially spaced radial enlargements thereof presenting, respectively, a first inlet chamber in communication with the fluid delivery side of said first pump, a second inlet chamber, first and second exhaust chambers in communication with said sump, a delivery chamber in communication with said ram, first and second transfer chambers connected with each other and with said first and second inlet chambers by internal passage means of said casing, an inlet passage connecting said internal passage means with the fluid delivery side of said second pump, check valve means associated with said internal passage means for preventing return flow of fluid from said transfer chambers into said first inlet chamber; a spool valve reciprocally mounted in said valve bore for controlling fluid flow from said first and second inlet chambers to said first and second transfer chambers, respectively, and from said first transfer chamber to said delivery chamber and from the latter to said second exhaust chamber; said internal passage means include a high resistance passage connecting said inlet passage with said second inlet chamber, and a low resistance passage connecting said inlet passage with said first and second transfer chambers; and check valve means associated with said low resistance passage so as to prevent return flow of fluid from said transfer chambers through said low resistance passage means to said inlet passage.

4. In a hydraulic power lift system for tractors, the combination of a first and second fluid pump having large and small output capacities, respectively; an implement lifting ram; a draft sensing device sump means operatively connected to said pumps, a bypass valve interposed between said sump and said second pump; means operatively connecting said bypass valve with said draft sensing device so said bypass valve is closed and opened in response to increase and decrease, respectively, of draft sensed by said draft sensing device; a manually operable control valve connected in fluid communicating relation with said first pump, second pump and ram, said control valve being selectively adjustable independently of said bypass valve for activating said ram for holding, lifting, lowering and transferring weight and, upon adjustment to said weight transferring, being effective in response to closing and opening, respectively, of said bypass valve, to activate and deactivate said ram independently of pressure fluid delivery thereto from said first pump; said manually operable control valve comprising a casing having a valve bore and axially spaced radial enlargements thereof presenting, respectively, a first inlet chamber in communication with the fluid delivery side of said first pump, a second inlet chamber, first and second exhaust chambers in communication with said sump, a delivery chamber in communication with said ram, first and second transfer chambers connected with each other and with said first and second inlet chambers by internal passage means of said casing, an inlet passage connecting said internal passage means with the fluid delivery side of said second pump, check valve means associated with said internal passage means for preventing return flow of fluid from said transfer chambers into said first inlet chamber, a spool valve reciprocally mounted in said valve bore for controlling fluid flow from said first and second inlet chambers to said first and second transfer chambers, respectively, and from said first transfer chamber to said delivery chamber and from the latter to said second exhaust chamber; and a relief valve operatively associated with the fluid delivery side of said second pump so as to limit pressure buildup of said second pump while said bypass valve is closed.

(References on following page)

References Cited by the Examiner

UNITED STATES PATENTS

| | | | |
|---|---|---|---|
| 1,932,761 | 10/33 | West | 60—52 |
| 2,321,516 | 6/43 | Robertson | 172—7 |
| 2,924,285 | 2/60 | Dushane et al. | 172—4 |
| 2,946,144 | 7/60 | Anderson | 60—52 |
| 2,974,733 | 3/61 | Fletcher | 172—7 |
| 2,979,908 | 4/61 | Shook | 60—52 |
| 3,003,568 | 10/61 | Merritt et al. | 172—9 |
| 3,013,617 | 12/61 | Heckenkamp | 172—8 |
| 3,014,536 | 12/61 | Marindin et al. | 172—3 X |
| 3,048,981 | 8/62 | Mark et al. | 60—97 |
| 3,053,234 | 9/62 | Chevreux | 172—9 |
| 3,064,426 | 11/62 | Furia et al. | 60—52 |

ABRAHAM G. STONE, *Primary Examiner.*